US011873701B2

(12) United States Patent
Chen et al.

(10) Patent No.: US 11,873,701 B2
(45) Date of Patent: *Jan. 16, 2024

(54) ENHANCED SCALE INHIBITOR SQUEEZE TREATMENT USING A CHEMICAL ADDITIVE

(71) Applicant: Halliburton Energy Services, Inc., Houston, TX (US)

(72) Inventors: Ping Chen, Dhahran (SA); Tawfik Hamoud Al-Ghamdi, Dhahran (SA); Zhiwei Yue, Houston, TX (US); Thomas Hagen, Dubai (AE); Mohamed Hassan Hamam, Dhahran (SA); Hicham El Hajj, Dammam (SA)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/095,181

(22) Filed: Jan. 10, 2023

(65) Prior Publication Data

US 2023/0160281 A1  May 25, 2023

Related U.S. Application Data

(63) Continuation of application No. 17/498,299, filed on Oct. 11, 2021, now Pat. No. 11,560,774.
(Continued)

(51) Int. Cl.
*E21B 37/06* (2006.01)
*C09K 8/584* (2006.01)
*C09K 8/52* (2006.01)

(52) U.S. Cl.
CPC ............ *E21B 37/06* (2013.01); *C09K 8/52* (2013.01); *C09K 8/584* (2013.01)

(58) Field of Classification Search
CPC ...................................................... E21B 37/06
See application file for complete search history.

(56) References Cited

U.S. PATENT DOCUMENTS

| 5,089,151 A | 2/1992 | Hall et al. |
| 8,211,835 B2 | 7/2012 | Howard et al. |
| (Continued) | | |

FOREIGN PATENT DOCUMENTS

| WO | 2014094544 A1 | 6/2014 |
| WO | 2015069293 A1 | 5/2015 |
| (Continued) | | |

OTHER PUBLICATIONS

Foreign Communication from Related Application—International Search Report and Written Opinion of the International Searching Authority, International Application No. PCT/US2021/054931, dated Apr. 22, 2022, 9 pages.

*Primary Examiner* — William D Hutton, Jr.
*Assistant Examiner* — Avi T Skaist
(74) *Attorney, Agent, or Firm* — Conley Rose, P.C.; Rodney B. Carroll

(57) ABSTRACT

Compositions and methods for the use in scale inhibitor squeeze treatments are provided. In some embodiments the present disclosure provides a method including introducing a pre-flush fluid into at least a portion of a subterranean formation, the pre-flush fluid including a choline chloride chemical additive; and introducing a treatment fluid including a scale inhibitor into the portion of the subterranean formation after at least a portion of the pre-flush fluid has been introduced into the portion of the subterranean formation.

20 Claims, 4 Drawing Sheets

Related U.S. Application Data

(60) Provisional application No. 63/092,657, filed on Oct. 16, 2020.

(56) References Cited

U.S. PATENT DOCUMENTS

| | | |
|---|---|---|
| 9,528,040 B2 | 12/2016 | Gaertner et al. |
| 11,560,774 B2 | 1/2023 | Chen et al. |
| 2012/0028855 A1 | 2/2012 | Miller |
| 2012/0118645 A1 | 5/2012 | Wilson, Jr. |
| 2012/0157356 A1 | 6/2012 | Dawson et al. |
| 2013/0306321 A1 | 11/2013 | Lanctot-Downs et al. |
| 2014/0243246 A1 | 8/2014 | Hendrickson |
| 2017/0190956 A1 | 7/2017 | Beach et al. |
| 2017/0342309 A1* | 11/2017 | Yue .................. C09K 8/528 |
| 2019/0002752 A1 | 1/2019 | Chen et al. |
| 2019/0345372 A1 | 11/2019 | Eluru et al. |
| 2020/0102487 A1* | 4/2020 | Eluru .................. C09K 8/68 |

FOREIGN PATENT DOCUMENTS

| | | |
|---|---|---|
| WO | 2016003446 A1 | 1/2016 |
| WO | 2016007150 A1 | 1/2016 |
| WO | 2016010520 A1 | 1/2016 |
| WO | 2016018350 A1 | 2/2016 |
| WO | 2017065804 A1 | 4/2017 |

* cited by examiner

ENHANCED SCALE INHIBITOR SQUEEZE TREATMENT USING A CHEMICAL ADDITIVE

CROSS-REFERENCE TO RELATED APPLICATION

This application is a continuation of and claims priority to U.S. patent application Ser. No. 17/498,299 filed Oct. 11, 2021, published as U.S. Patent Application Publication No. 2022/0120159 A1, and entitled "Enhanced Scale Inhibitor Squeeze Treatment Using a Chemical Additive," which claims priority to U.S. Provisional Application No. 63/092,657, filed Oct. 16, 2020, both of which are incorporated herein by reference in their entirety.

BACKGROUND

The present disclosure relates to methods, compositions, and systems for treating subterranean formations to reduce the formation of scales therein.

Oilfield fluids (e.g., oil, gas, and water) may be complex mixtures of aliphatic hydrocarbons, aromatics, heteroatomic molecules, anionic and cationic salts, acids, sands, silts, clays and a vast array of other components. The nature of these fluids combined with sometimes severe conditions of heat, pressure, and turbulence to which they are often subjected during retrieval, may be contributory factors to scale formation in oil and/or gas production wells and surface equipment. Wherever water production occurs, the potential for some type of scale formation may exist. "Scale," as the term is used herein, may refer to any mineral or solid salt deposit that forms in a formation, for example, when the saturation of formation water to one or more minerals is affected by changing physical conditions (such as temperature, pressure, or composition), thus causing minerals and salts previously in solution to precipitate into solids. Scale deposits may include a variety of materials, including but not limited to calcium carbonate, calcium sulfate, barium sulfate, strontium sulfate, iron sulfides, and the like. Scale deposits can form on any surface in a down hole operation, including subterranean formations, production tubing, gravel packing screens, and other well bore equipment. Scale can develop almost immediately or build up over several months before becoming noticeable. The effect scale has on productivity may depend, at least in part, on the type, location, and the mass deposited. Scale formation can become so severe as to restrict or even completely choke production. The formation of scale can decrease permeability of the subterranean formation, reduce well productivity and shorten the lifetime of production equipment. In order to clean scale from wells and equipment it may be necessary to stop production, which is both time-consuming and costly.

The formation of scale may be controlled by the use of chemical scale inhibitors that reduce or prevent the precipitation and/or deposit of these scales in the formation. Several methods are known in the art for introducing scale inhibitors into production wells. For example, a solid form of a scale inhibitor may be placed into the formation; however, this method may be limited due to the fact that there are relatively few effective solid scale inhibitors and each has functional or design limitations. Another known method of placing scale inhibitor is a "squeeze" application in which a scale inhibitor is introduced into a formation and adsorbed or precipitates onto the reservoir rock surfaces and helps prevent or diminish scale deposition. However, it may be difficult to confirm whether the scale inhibitor has been adsorbed onto the rock surface with sufficient mechanical strength to avoid displacement by fluids flowing through the formation, and in an adequate amount to provide effective scale inhibition. In some cases, it may require long periods of shut-in time to allow the scale inhibitor to adequately adsorb onto rock surfaces downhole.

BRIEF DESCRIPTION OF THE DRAWINGS

These drawings illustrate certain aspects of some of the embodiments of the present disclosure and should not be used to limit or define the claims.

Figure 1A:
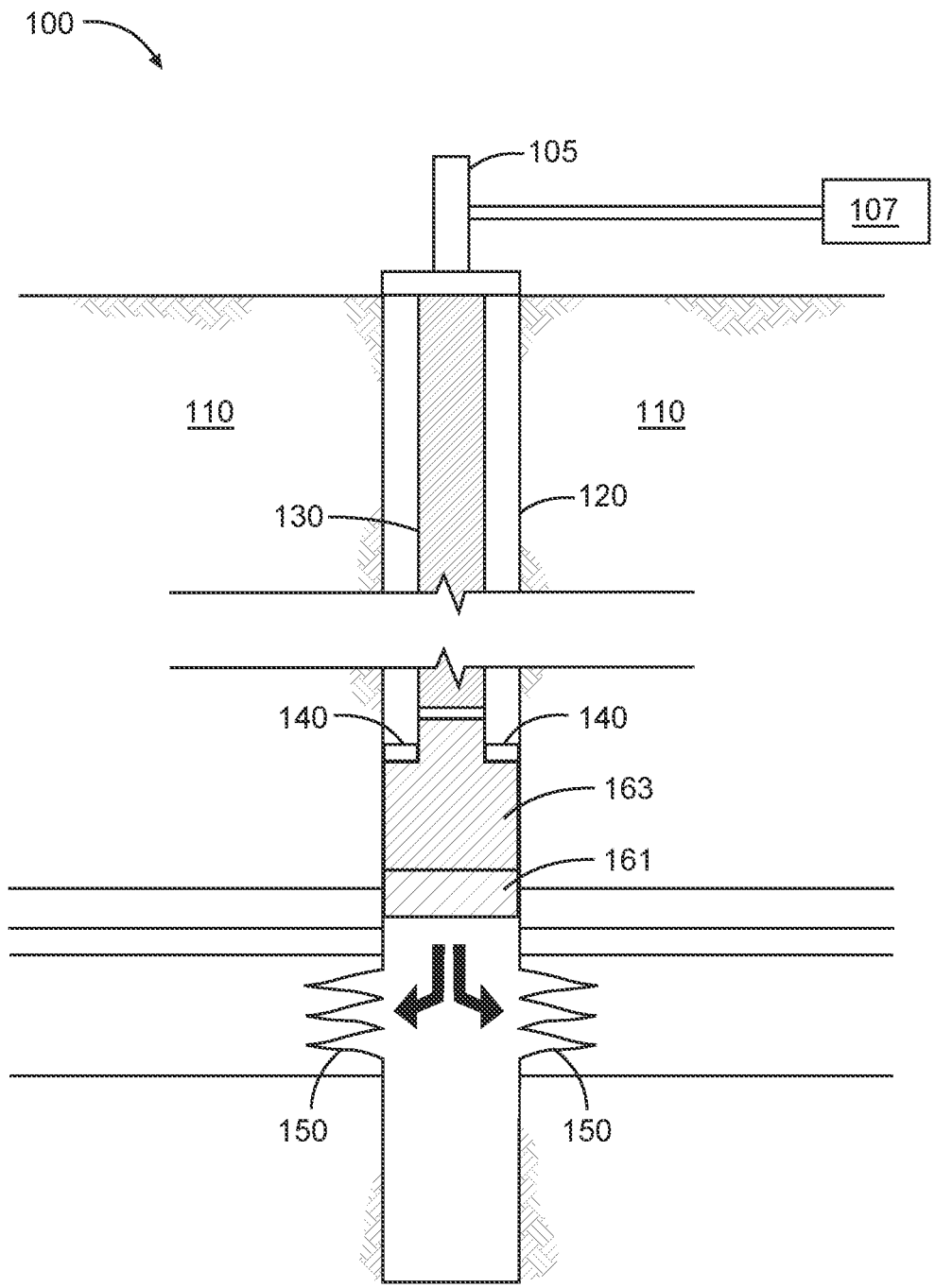
FIGS. 1A and 1B are diagrams illustrating a scale inhibitor squeeze treatment according to certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the invention. Embodiments of the present disclosure involving wellbores may be applicable to horizontal, vertical, deviated, or otherwise nonlinear wellbores in any type of subterranean formation. Embodiments may be applicable to injection wells, monitoring wells, and production wells, including hydrocarbon or geothermal wells.

The present disclosure provides methods, compositions, and systems for applying and/or enhancing scale inhibitor squeeze treatments in subterranean formations by treating a portion of the formation with a pre-flush fluid that includes one or more of chemical additives. For example, the methods and compositions of the present disclosure may include a chemical additive that may, inter alia, target enhancement of treatment life with a limited injected fluid volume. In certain embodiments, the chemical additives of the present disclosure may be substantially or fully compatible with high salinity brine and thermally stable at reservoir temperature. In the methods of the present disclosure, a pre-flush fluid including one or more of these chemical additives may be introduced into at least a portion of a subterranean formation, after which a treatment fluid including a scale inhibitor is also introduced into that portion of a subterranean formation. In certain embodiments, the fluids are introduced (e.g., injected or pumped) into the formation via a well bore penetrating the subterranean formation, and are introduced at a pressure sufficient to push the fluids into at least the near well bore area of a portion of the subterranean formation (although typically below the pressure that will create or enhance fractures in the formation). Without limiting the disclosure to any particular theory or mechanism, it is believed that the chemical additives of the present disclosure may change water wetting characteristics of the rock surfaces within the subterranean formation. In some embodiments, the chemical additives may also impart a positive charge to the rock surface, which may allow greater binding of a positively charged scale inhibitor. When the chemical additives are applied to a formation in a pre-flush treatment, it is believed that they may facilitate the adsorption of the scale inhibitor introduced in a subsequent treatment onto rock surfaces in the formation.

Among the many potential advantages to the methods and compositions of the present disclosure, only some of which are alluded to herein, the methods, compositions, and systems of the present disclosure may allow for more effective application of scale inhibitor squeeze treatments in a number of ways. For example, in certain embodiments, the methods and systems of the present disclosure may reduce the shut-in time needed to allow for effective adsorption and/or precipitation of the scale inhibitor in the formation. In certain embodiments, the methods and systems of the present disclosure may permit the scale inhibitor to more strongly bond and/or adhere to rock surfaces within a formation and may increase the amount of time during which a scale inhibitor squeeze treatment may remain effective. The precipitation and/or adsorption of the scale inhibitor may at least partially depend on pH (e.g., generally tending to occur at higher pH conditions), and thus may be easily reduced or removed from the formation by altering the pH conditions downhole (e.g., flushing a weak acid solution into the formation). The methods and systems of the present disclosure may be able to place scale inhibitor squeeze treatments without the use of concentrated brines, which sometimes cause formation damage. These and other benefits may facilitate the use of certain types of scale inhibitors that are more environmentally-friendly but often impractical or unsuitable for use in certain types of formations.

In some embodiments, the chemical additives of the present disclosure may include a choline chloride. In some embodiments, the choline chlorides may be an organic compound having the formula $[(CH_3)_3NCH_2CH_2OH]^+ Cl^-$. For example, the chemical additives of the present disclosure may have the following chemical structure:

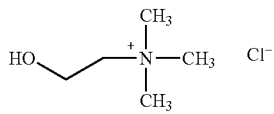

In certain embodiments, the chemical additive may be bifunctional. For example, in one or more embodiments, the chemical additive may include both a quaternary ammonium salt and an alcohol.

As discussed above, the present disclosure provides certain methods of treating a subterranean formation with one or more scale inhibitors, for example, in a scale inhibitor squeeze treatment. Scale inhibitor squeeze treatment technology may be employed in the industry when a scale control treatment strategy is considered for prevention of scale depositions in a reservoir and downhole tubing. Scale inhibitor squeeze technology may offer a cost-effective method without requirements of extra power once the scale inhibitor is placed in a reservoir. In certain embodiments, the scale inhibitor squeeze treatment process may involve several steps, as described in greater detail below. In some embodiments, the scale inhibitor squeeze treatment process may include a pre-flush with a specially designed fluid. The injected pre-flush fluid can push the formation brine away deeper into the formation to mitigate problems resulting from any incompatibility between a forthcoming injected chemical and the formation brine. The cooling effect caused by the pre-flush fluid injection can also reduce the rate of the scale inhibitor adsorption and hence more scale inhibitor can be adsorbed on the far distance of the reservoir rocks from well-bore. In certain embodiments, surfactants and squeeze enhancing additives, such as the chemical additives of the present disclosure, may be added in the pre-flush fluids to change the rock wettability in favor of the inhibitor adsorption to extend squeeze treatment life.

In certain embodiments, after the pre-flush stage, the scale inhibitor squeeze treatment process may include adding a scale inhibitor main pill. In some embodiments, the scale inhibitors of the main pill may be a phosphonic acid. In certain embodiments, the scale inhibitor may be a phosphonic acid selected from the group consisting of amino trimethylene phosphonic acid (ATMP), 1-hydroxyethane 1,1-diphosphonic acid (HEDP), amino tris (methylenephosphonic acid) (ATMP), ethylenediamine tetra (methylene phosphonic acid) (EDTMP), tetramethylenediamine tetra(methylene phosphonic acid) (TDTMP), hexamethylenediamine tetra(methylene phosphonic acid) (HDTMP), ethylene diamine tetra (methylene phosphonic acid) (EDTMPA), diethylenetriamine penta(methylene phosphonic acid) (DTPMP), bis(hexamethylene triamine penta (methylene phosphonic acid)) (BHMPTPMP), any derivative thereof, and any combination thereof.

In some embodiments, the scale inhibitor squeeze treatment process may include adding a scale inhibitor in a main pill in a concentration range of from about 5% to about 50%. In other embodiments, the scale inhibitor squeeze treatment process may include adding a scale inhibitor in a main pill in a concentration range of from about 5% to about 20%. Following the pre-flush, the inhibitor pill may be injected into a formation. During this injection stage, the pumping injection pressure may be carefully monitored. Sudden pressure spiking could be a sign of incompatibility between the injected fluid and reservoir. In some embodiments, the treatment process may include a well shut-in step. In some embodiments, after the main pill scale inhibitor injection, the well may be shut in for a time period, for example, in the range of from about 6 hours to about 24 hours. In some embodiments, the scale inhibitor squeeze treatment process may include a well production step. Following the shut-in period, wells may be placed back in normal production operations. Brine samples may be collected regularly for analysis of the ions and residual scale inhibitors. Once the residual scale inhibitor concentration drops below the minimum inhibitor concentration (MIC) required to control scale deposition, a new scale inhibitor squeeze treatment may be needed. Without intending to be limited to any particular theory or mechanism, it is believed that the scale inhibitors may be precipitated with $Ca^{2+}$, which may enable better placement within the formation while causing less formation damage.

In some embodiments, the chemical additives may be added in the pre-flush fluid. In some embodiments, the chemical additives of the present disclosure may be suitable for down-hole squeeze treatment applications with typical treatment rates ranged from 1% to 20% by volume of the pre-flush fluid. In other embodiments, the chemical additives of the present disclosure may be suitable for down-hole squeeze treatment applications with typical treatment rates ranged from 1% to 10% by volume of the pre-flush fluid. In still other embodiments, the chemical additives of the present disclosure may be suitable for down-hole squeeze treatment applications with typical treatment rates ranged from 2% to 5% by volume of the pre-flush fluid. In certain embodiments, the chemical additives may be added to both the pre-flush fluids and the after-flush fluids. In some embodiments, the chemical additives may be added to the pre-flush fluids with typical treatment rates ranged from 1% to 10% by volume of the pre-flush fluid and added to the after-flush fluids with typical treatment rates ranged from 2% to 3% by volume of the after-flush fluid.

In certain embodiments, the effectiveness of the scale inhibitor squeeze treatment and appropriate treatment rate may depend on the mineralogy of the rock within the subterranean formation. In some embodiments, the effectiveness of the scale inhibitor squeeze treatment and optimal treatment rate may depend on the applied scale inhibitor concentration and/or volumes. In one or more embodiments, the effectiveness of the scale inhibitor squeeze treatment and optimal treatment rate may depend on downhole system conditions such as temperature and pH. For example, in some embodiments, the chemical additives of the present disclosure may be used at temperatures in the range of from about 0° C. to about 200° C. In other embodiments, the chemical additives of the present disclosure may be used at temperatures in the range of from about 50° C. to about 150° C. In still other embodiments, the chemical additives of the present disclosure may be used at temperatures in the range of from about 50° C. to about 100° C. In some embodiments, the chemical additives of the present disclosure may be used at a pH less than about 8. In other embodiments, the chemical additives of the present disclosure may be used at a pH less than about 7. In still other embodiments, the chemical additives of the present disclosure may be used at a pH less than about 5.

In some embodiments, a successful scale inhibitor squeeze treatment in accordance with the present disclosure may provide good retention/release properties to offer a long-term treatment life. In certain embodiments, a successful scale inhibitor squeeze treatment in accordance with the present disclosure may result in an MIC in a range of from about 1 ppm to about 30 ppm. In some embodiments, the scale inhibitor may flow back to the surface at a concentration from several thousand ppm (e.g., 10,0000 ppm) to about 1 ppm. Further, in some embodiments, a successful scale inhibitor squeeze treatment in accordance with the present disclosure may result in zero or substantially zero formation damage when the scale inhibitor is placed in the reservoir.

Figure 1B:
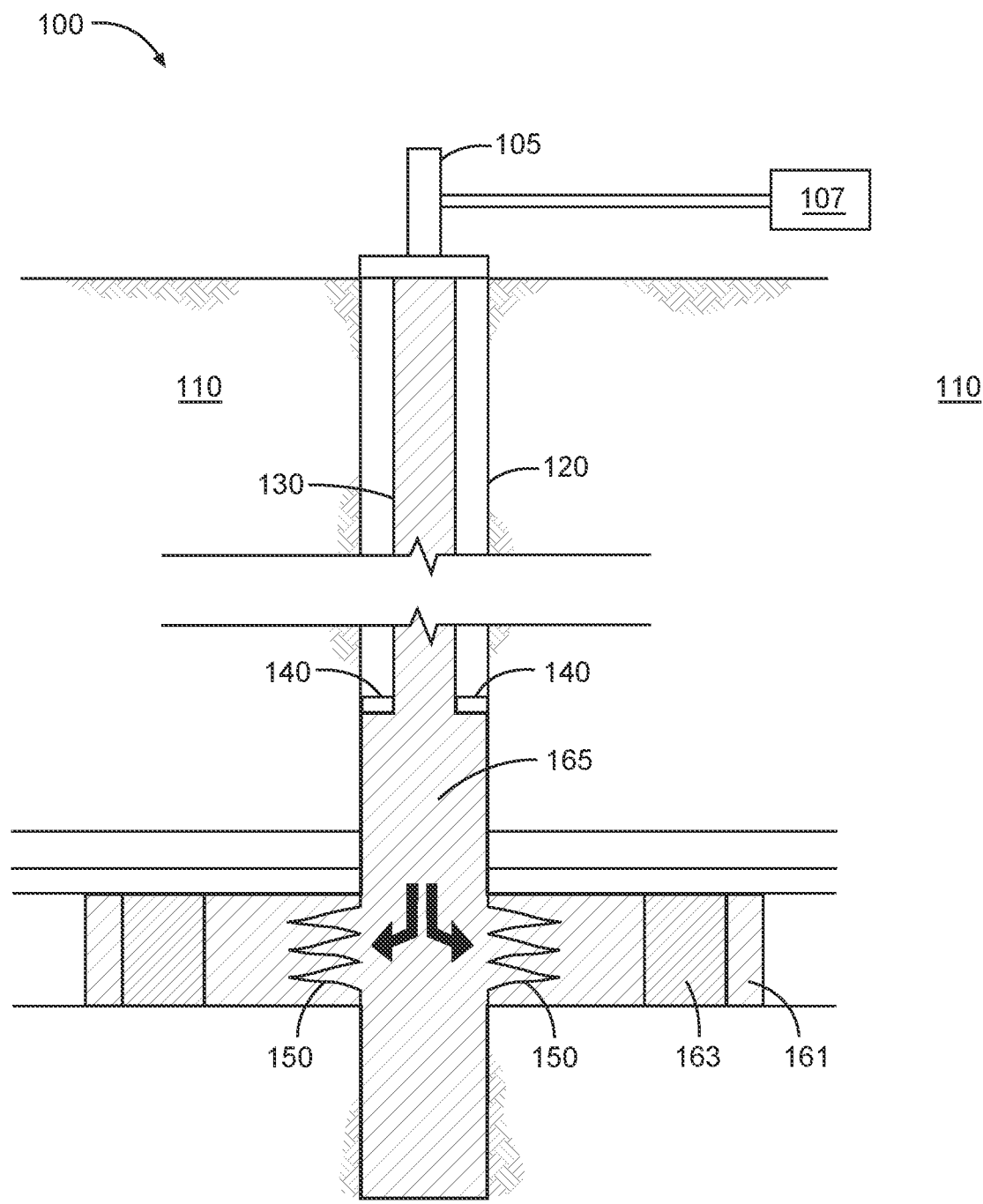

An example of a scale inhibitor squeeze treatment process in accordance with certain embodiments of the present disclosure is illustrated in FIGS. 1A and 1B. Referring now to FIG. 1A, a well site 100 is shown at which a well bore 120 has been drilled to penetrate a portion of subterranean formation 110. The well bore 120 may include an open hole, or it may include one or more casing strings (not shown) disposed therein. A wellhead 105 is installed at the top of the well bore 120 to which treating equipment 107 is coupled. The treating equipment 107 may include pumps, fluid sources, blenders, liquid additive pumps, solid additive hoppers, and/or other equipment used to prepare and/or inject fluids and additives into the well bore 120. For example, treating equipment 107 may include a pump and blender system designed to mix the pre-flush fluids, treatment fluids, and/or after-flush fluids of the present disclosure. A string of production tubing 130 is disposed in the well bore and extends from the well head down to approximately the depth of a hydrocarbon-bearing portion of the formation 110 and is held in place by a packer 140. One or more perforations 150 in the well bore wall or casing also provide fluid communication between the hydrocarbon-bearing portion of the formation 110 and the production tubing 130.

In certain embodiments of the scale inhibitor squeeze treatments of the present disclosure, a pre-flush fluid 161 including one or more chemical additives is injected into the production tubing 130 using one or more pumps in the treating equipment 107. This pre-flush fluid also may be used to clean debris or other substances out of the producing area of the well bore 120 and formation 110 either by mechanically displacing them from that region or by chemical treatment (e.g., acid dissolution). In certain embodiments, additional pre-flush fluids, cleaning fluids, etc. (not shown) may be injected into the well bore prior to pre-flush fluid 161. Next, a treatment fluid 163 of the present disclosure including a scale inhibitor is injected into the production tubing 130 using one or more pumps in the treating equipment 107. In certain embodiments, the treatment fluid 163 also may be preceded by additional fluids (not shown), such as spacer fluids used to separate treatment fluid 163 from pre-flush fluid 161, or another pre-flush/treatment fluid that includes a smaller concentration of the scale inhibitor (as compared to treatment fluid 163) that may be used to prepare the formation to adsorb the scale inhibitor in treatment fluid 163.

Referring now to FIG. 1B, a later stage of the squeeze treatment from FIG. 1A is shown at the same well site 100. Following the injection of the treatment fluid 163 (and, optionally, additional spacer fluids), an after-flush/displacement fluid 165 is injected into the production tubing 130 using one or more pumps in the treating equipment 107. As shown, fluid 165 displaces the pre-flush fluid 161 and treatment fluid 163 through the perforations 150 and into the near well bore area of the formation 110. This allows the chemical additives in fluid 161 to prepare the formation 110 for adsorption of the scale inhibitor that then enters the formation 110 in fluid 163.

Following the complete injection of fluid 165, the well bore 120 may be shut in for a period of time in order to allow the scale inhibitor to soak in and adsorb onto the rock surfaces in formation 110. This period of shut-in time may vary from a few hours to several days, depending on a number of factors that a person of skill in the art will recognize with the benefit of this disclosure, such as the size and/or depth of the well bore, temperature and/or pressure conditions in the formation, the composition of the formation, the types and amounts of surfactants and/or scale inhibitors used, and other similar factors.

Following that shut-in time, the well bore 120 may be brought into production during which fluids from the formation 110 are permitted to flow out of the well bore 120 to the surface via production tubing 130. As that occurs, the produced fluids may carry some amount of the adsorbed scale inhibitor through the perforations 150 and production tubing 130. In certain embodiments, this may prevent or reduce the formation of scales in those areas. In certain embodiments, additional tools, tubulars, valves, and/or other equipment (not shown) may be disposed along the production tubing 130. The flow of the produced fluid carrying the scale inhibitor may prevent or reduce the formation of scales in that equipment as well. In some instances, the concentration of scale inhibitor in the fluids flowing out of the well bore may be monitored during production to confirm that they are sufficient to control scale formation at that well. If the concentration of the scale inhibitor falls below a certain threshold amount, it may be determined that additional treatments (e.g., additional scale inhibitor squeeze treatments) will be performed.

The pre-flush fluids, treatment fluids, and/or after-flush fluids used in the methods and systems of the present disclosure may include any base fluid known in the art, including aqueous base fluids, non-aqueous base fluids, and any combinations thereof. The term "base fluid" refers to the major component of the fluid (as opposed to components dissolved and/or suspended therein), and does not indicate any particular condition or property of that fluids such as its mass, amount, pH, etc. Aqueous fluids that may be suitable for use in the methods and systems of the present disclosure may include water from any source. Such aqueous fluids may include fresh water, salt water (e.g., water containing one or more salts dissolved therein), brine (e.g., saturated salt water), seawater, or any combination thereof. In most embodiments of the present disclosure, the aqueous fluids include one or more ionic species, such as those formed by salts dissolved in water. For example, seawater and/or produced water may include a variety of divalent cationic species dissolved therein. In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, whether that fluid is being used to enhance adsorption, desorption, precipitation, or dissolution of the scale inhibitor. One of ordinary skill in the art, with the benefit of this disclosure, will recognize when such density and/or pH adjustments are appropriate. Examples of non-aqueous fluids that may be suitable for use in the methods and systems of the present disclosure include, but are not limited to, oils, hydrocarbons, alcohols, organic liquids/solvents, and the like. In certain embodiments, the fracturing fluids may include a mixture of one or more fluids and/or gases, including but not limited to emulsions, foams, and the like.

In certain embodiments, the pre-flush fluids, treatment fluids, and/or after-flush fluids used in the methods and systems of the present disclosure optionally may include any number of additional additives. Examples of such additional additives include, but are not limited to, salts, surfactants, acids, proppant particulates, diverting agents, fluid loss control additives, gas, nitrogen, carbon dioxide, surface modifying agents, tackifying agents, foamers, corrosion inhibitors, catalysts, clay control agents, biocides, friction reducers, antifoam agents, bridging agents, flocculants, $H_2S$ scavengers, $CO_2$ scavengers, oxygen scavengers, lubricants, viscosifiers, breakers, weighting agents, relative permeability modifiers, resins, wetting agents, coating enhancement agents, filter cake removal agents, antifreeze agents (e.g., ethylene glycol), and the like. A person skilled in the art, with the benefit of this disclosure, will recognize the types of additives that may be included in the fluids of the present disclosure for a particular application.

In certain embodiments, the fluids may be formed at a well site where the operation or treatment is conducted, either by batch mixing or continuous ("on-the-fly") mixing. The term "on-the-fly" is used herein to include methods of combining two or more components wherein a flowing stream of one element is continuously introduced into a flowing stream of at least one other component so that the streams are combined and mixed while continuing to flow as a single stream as part of the on-going treatment. Such mixing can also be described as "real-time" mixing. In other embodiments, the treatment fluids of the present disclosure may be prepared, either in whole or in part, at an offsite location and transported to the site where the treatment or operation is conducted. In introducing a treatment fluid of the present disclosure into a portion of a subterranean formation, the components of the treatment fluid may be mixed together at the surface and introduced into the formation together, or one or more components may be introduced into the formation at the surface separately from other components such that the components mix or intermingle in a portion of the formation to form a treatment fluid. In either such case, the treatment fluid is deemed to be introduced into at least a portion of the subterranean formation for purposes of the present disclosure.

Among the many potential advantages to the methods and compositions of the present disclosure, only some of which are alluded to herein, the methods, compositions, and systems of the present disclosure may provide improved clay stabilization as a pre-flush agent for down-hole squeeze treatment. The methods and compositions of the present disclosure may also change the rock wettability towards more water wet for enhanced scale inhibitor retention in reservoirs and hence extend scale inhibitor squeeze treatment life. The methods and compositions of the present disclosure may also be effective in a wide variety of oilfield waters. The methods and compositions of the present disclosure may also enhance a downhole squeeze treatment lifetime. The methods and compositions of the present disclosure may also provide a reduced squeeze treatment frequency and annualized deferred oil saving by applying the chemical additive as the squeeze treatment enhancer. The methods and compositions of the present disclosure may also reduce the cost of spending on scale control for an oil company.

To facilitate a better understanding of the present disclosure, the following examples of certain aspects of certain embodiments are given. The following examples are not the only examples that could be given according to the present disclosure and are not intended to limit the scope of the disclosure or claims.

Examples

Figure 2:
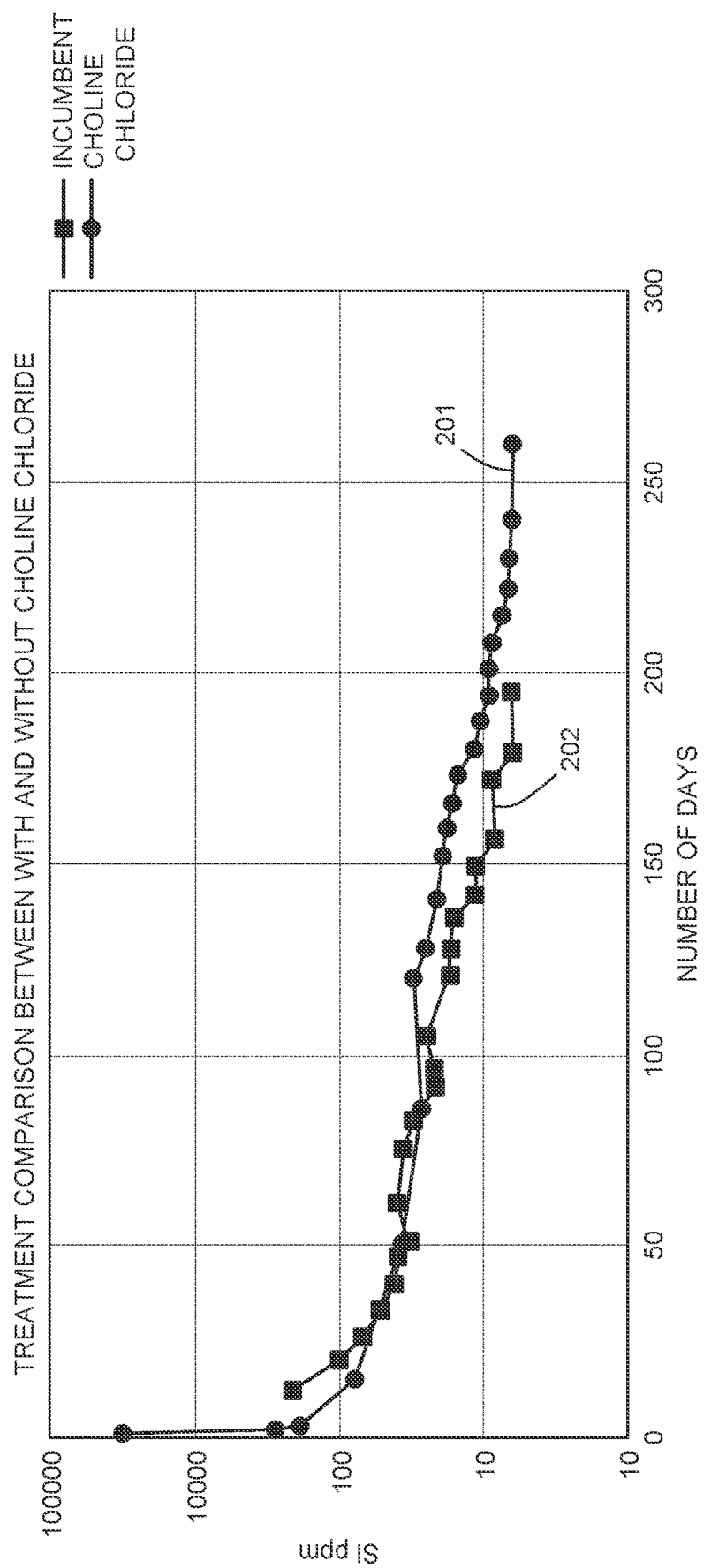
FIG. 2 is a graph illustrating data from desorption tests of certain methods of the present disclosure.

The results from an initial field trial are presented in FIG. 2. In the field trial, two separate scale inhibitor squeeze treatments were performed. Before the first scale inhibitor squeeze treatment, no choline chloride was added during the pre-flush stage. For the second scale inhibitor squeeze treatment, a pre-flush fluid containing 2% by volume of choline chloride was applied to the formation. The graph shown in FIG. 2 depicts the concentration of scale inhibitor in fluids recovered from the formation as a function of time. Line 201 represents the scale inhibitor squeeze treatment after pre-flush treatment with the choline chloride chemical additive of the present disclosure. Line 202 represents the previous scale inhibitor squeeze treatment without the chemical additive of the present disclosure. The minimum scale inhibitor concentration was found at 5 ppm. As seen from FIG. 2, the treatment life (i.e., time to reach the minimum scale inhibitor concentration) increased more than 70 days when the choline chloride chemical additive of the present disclosure is applied.

Figure 3:
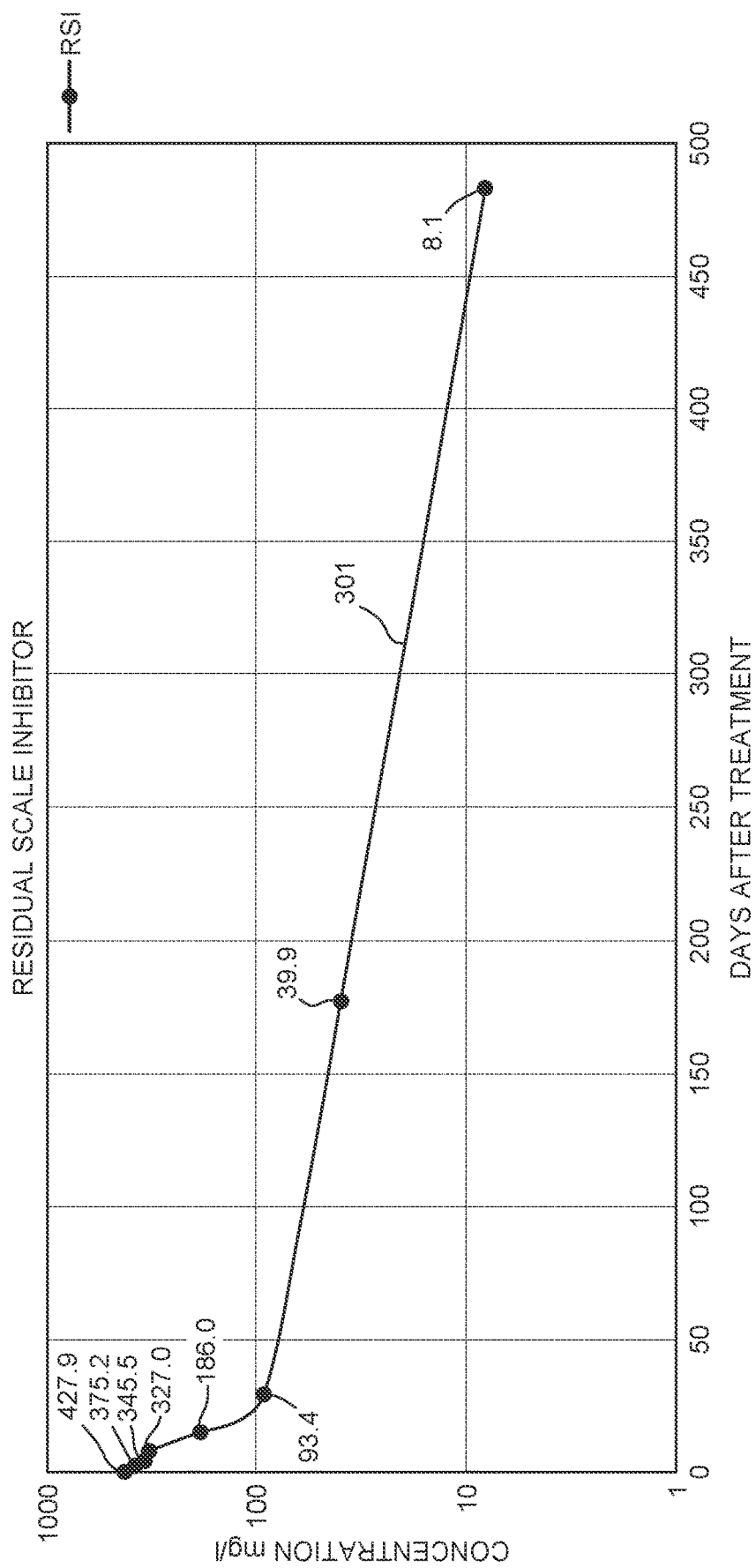
FIG. 3 is a graph illustrating data from desorption tests of certain methods of the present disclosure.

The results from an additional field trial are presented in FIG. 3. For this field trial, a pre-flush fluid containing 3% by volume of choline chloride was applied to the formation prior to performing the scale inhibitor squeeze treatment. Line 301 represents the scale inhibitor squeeze treatment with choline chloride chemical additive. The minimum scale inhibitor concentration was found at 5 ppm. As seen from FIG. 3, a treatment life (i.e., time to reach the minimum scale inhibitor concentration) of over 450 days was achieved when the choline chloride chemical additive of the present disclosure is applied.

An embodiment of the present disclosure is a method including introducing a pre-flush fluid into at least a portion of a subterranean formation, the pre-flush fluid including a chemical additive having the following structural formula:

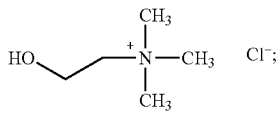

and introducing a treatment fluid including a scale inhibitor into the portion of the subterranean formation after at least a portion of the pre-flush fluid has been introduced into the portion of the subterranean formation.

In one or more embodiments described in the preceding paragraph, the method further includes allowing at least a portion of the scale inhibitor to adsorb onto a rock surface in at least a portion of the subterranean formation. In one or more embodiments described above, the method further includes introducing an after-flush fluid into the portion of the subterranean formation after at least a portion of the scale inhibitor has been introduced into the portion of the subterranean formation. In one or more embodiments described above, the method further includes shutting in the well bore for a predetermined period of time; and allowing one or more produced fluids in the subterranean formation to flow from the formation and through the well bore after the predetermined period of time has ended. In one or more embodiments described above, the scale inhibitor includes a phosphonic acid selected from the group consisting of amino trimethylene phosphonic acid (ATMP), 1-hydroxyethane 1,1-diphosphonic acid (HEDP), amino tris(methylenephosphonic acid) (ATMP), ethylenediamine tetra(methylene phosphonic acid) (EDTMP), tetramethylenediamine tetra (methylene phosphonic acid) (TDTMP), hexamethylenediamine tetra(methylene phosphonic acid) (HDTMP), ethylene diamine tetra (methylene phosphonic acid) (EDTMPA), diethylenetriamine penta(methylene phosphonic acid) (DTPMP), bis(hexamethylene triamine penta (methylene phosphonic acid)) (BHMPTPMP), any derivative thereof, and any combination thereof. In one or more embodiments described above, the method further includes allowing the chemical additive to increase a wettability of at least a portion of a rock surface in the portion of the subterranean formation. In one or more embodiments described above, the pre-flush fluid further includes an amount of the scale inhibitor at a concentration smaller than the amount of the scale inhibitor in the treatment fluid. In one or more embodiments described above, the chemical additive is present in the pre-flush fluid in an amount of from about 1% to about 10% by volume of the fluid. In one or more embodiments described above, the scale inhibitor is present in the treatment fluid in an amount of less than about 10% by volume of the fluid. In one or more embodiments described above, the pH in the portion of the subterranean formation is less than about 8.

Another embodiment of the present disclosure is a method including introducing a pre-flush fluid into at least a portion of a subterranean formation, the pre-flush fluid including a chemical additive having the following structural formula:

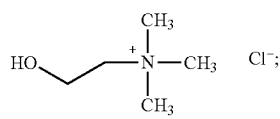

introducing a treatment fluid including a scale inhibitor into the portion of the subterranean formation after at least a portion of the pre-flush fluid has been introduced into the portion of the subterranean formation; and introducing an after-flush fluid into the portion of the subterranean formation after at least a portion of the scale inhibitor has been introduced into the portion of the subterranean formation, the after-flush fluid including the chemical additive.

In one or more embodiments described in the preceding paragraph, the method further includes allowing at least a portion of the scale inhibitor to adsorb onto a rock surface in at least a portion of the subterranean formation. In one or more embodiments described above, the method further includes shutting in the well bore for a predetermined period of time; and allowing one or more produced fluids in the subterranean formation to flow from the formation and through the well bore after the predetermined of time has ended. In one or more embodiments described above, the scale inhibitor includes a phosphonic acid selected from the group consisting of amino trimethylene phosphonic acid (ATMP), 1-hydroxyethane 1,1-diphosphonic acid (HEDP), amino tris(methylenephosphonic acid) (ATMP), ethylenediamine tetra(methylene phosphonic acid) (EDTMP), tetramethylenediamine tetra(methylene phosphonic acid) (TDTMP), hexamethylenediamine tetra(methylene phosphonic acid) (HDTMP), ethylene diamine tetra (methylene phosphonic acid) (EDTMPA), diethylenetriamine penta(methylene phosphonic acid) (DTPMP), bis(hexamethylene triamine penta (methylene phosphonic acid)) (BHMPTPMP), any derivative thereof, and any combination thereof. In one or more embodiments described above, the chemical additive is present in the pre-flush fluid in an amount of from about 2% to about 3% by volume of the fluid. In one or more embodiments described above, the chemical additive is present in the after-flush fluid in an amount of from about 0.5%% to about 1.5% by volume of the fluid. In one or more embodiments described above, the pH in the portion of the subterranean formation is less than about 8.

Another embodiment of the present disclosure is a method including introducing a pre-flush fluid into at least a portion of a subterranean formation, the pre-flush fluid including a chemical additive having the following structural formula:

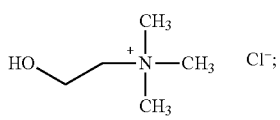

introducing a treatment fluid including a scale inhibitor into the portion of the subterranean formation after at least a portion of the pre-flush fluid has been introduced into the portion of the subterranean formation; and introducing an after-flush fluid into the portion of the subterranean formation after at least a portion of the scale inhibitor has been introduced into the portion of the subterranean formation.

In one or more embodiments described in the preceding paragraph, the method further includes allowing at least a portion of the scale inhibitor to adsorb onto a rock surface in at least a portion of the subterranean formation. In one or more embodiments described above, the method further includes shutting in the well bore for a predetermined period of time; and allowing one or more produced fluids in the subterranean formation to flow from the formation and through the well bore after the predetermined of time has ended.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
    introducing a pre-flush fluid into at least a portion of a subterranean formation, the pre-flush fluid comprising a chemical additive having the following structural formula:

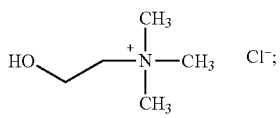

wherein the chemical additive is present in an amount effective to change the rock wettability towards more water wet for enhanced scale inhibitor retention; and
    introducing a treatment fluid comprising a scale inhibitor into the portion of the subterranean formation after at least a portion of the pre-flush fluid has been introduced into the portion of the subterranean formation.

2. The method of claim 1 wherein the chemical additive is present in an amount of 1% to 20% by volume of the pre-flush fluid.
3. The method of claim 1 wherein the chemical additive is present in an amount of 1% to 10% by volume of the pre-flush fluid.
4. The method of claim 1 wherein the chemical additive is present in an amount of 2% to 5% by volume of the pre-flush fluid.
5. The method of claim 1 wherein a minimum inhibitor concentration is in a range of from about 1 ppm to about 30 ppm.
6. The method of claim 1 wherein the scale inhibitor comprises a phosphonic acid selected from the group consisting of amino trimethylene phosphonic acid (ATMP), 1-hydroxyethane 1,1-diphosphonic acid (HEDP), amino tris (methylenephosphonic acid) (ATMP), ethylenediamine tetra (methylene phosphonic acid) (EDTMP), tetramethylenediamine tetra(methylene phosphonic acid) (TDTMP), hexamethylenediamine tetra(methylene phosphonic acid) (HDTMP), ethylene diamine tetra (methylene phosphonic acid) (EDTMPA), diethylenetriamine penta(methylene phosphonic acid) (DTPMP), bis(hexamethylene triamine penta (methylene phosphonic acid)) (BHMPTPMP), any derivative thereof, and any combination thereof.
7. The method of claim 1 wherein the pre-flush fluid further comprises a scale inhibitor at a concentration smaller than the amount of the scale inhibitor in the treatment fluid.
8. The method of claim 1 wherein the scale inhibitor is present in the treatment fluid in an amount of about 5% to about 20% by volume of the fluid.
9. The method of claim 1 wherein the pH in the portion of the subterranean formation is less than about 8.
10. A method for a squeeze treatment comprising:
    introducing a pre-flush fluid into at least a portion of a subterranean formation improving clay stabilization, the pre-flush fluid comprising a chemical additive having the following structural formula:

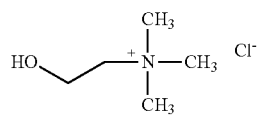

wherein the chemical additive is present in the pre-flush fluid in an amount of from about 1% to about 20% by volume of the pre-flush fluid, and wherein the chemical additive changes the rock wettability towards more water wet for enhanced scale inhibitor retention;
    introducing a treatment fluid comprising a scale inhibitor into the portion of the subterranean formation after at least a portion of the pre-flush fluid has been introduced into the portion of the subterranean formation; and
    introducing an after-flush fluid into the portion of the subterranean formation after at least a portion of the scale inhibitor has been introduced into the portion of the subterranean formation, the after-flush fluid comprising the chemical additive.
11. The method of claim 10 further comprising allowing at least a portion of the scale inhibitor to adsorb onto a rock surface in at least a portion of the subterranean formation while minimizing formation damage.
12. The method of claim 10 further comprising:
    shutting in the well bore for about 6 to about 24 hours; and afterwards allowing one or more produced fluids in the subterranean formation to flow from the formation and through the well bore.

13. The method of claim 10 wherein the scale inhibitor comprises a phosphonic acid selected from the group consisting of: amino trimethylene phosphonic acid (ATMP), 1-hydroxyethane 1,1-diphosphonic acid (HEDP), amino tris (methylenephosphonic acid) (ATMP), ethylenediamine tetra (methylene phosphonic acid) (EDTMP), tetramethylenediamine tetra(methylene phosphonic acid) (TDTMP), hexamethylenediamine tetra(methylene phosphonic acid) (HDTMP), ethylene diamine tetra (methylene phosphonic acid) (EDTMPA), diethylenetriamine penta(methylene phosphonic acid) (DTPMP), bis(hexamethylene triamine penta (methylene phosphonic acid)) (BHMPTPMP), any derivative thereof, and any combination thereof.

14. The method of claim 10 wherein the chemical additive is present in an amount of 1% to 10% by volume of the pre-flush fluid.

15. The method of claim 10 wherein the chemical additive is present in an amount of 2% to 5% by volume of the pre-flush fluid.

16. The method of claim 10 wherein the chemical additive is present in the after-flush fluid in an amount of from about 0.5% to about 1.5% by volume of the fluid.

17. The method of claim 10 wherein the pH in the portion of the subterranean formation is less than about 8.

18. A method comprising:
    introducing a pre-flush fluid into at least a portion of a subterranean formation, the pre-flush fluid comprising a chemical additive having the following structural formula:

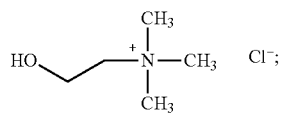

wherein the chemical additive is present in the pre-flush fluid in an amount of from about 1% to about 20% by volume of the fluid effective to change the rock wettability towards more water wet for enhanced scale inhibitor retention; and
    introducing a treatment fluid comprising a scale inhibitor into the portion of the subterranean formation after at least a portion of the pre-flush fluid has been introduced into the portion of the subterranean formation; and
    introducing an after-flush fluid into the portion of the subterranean formation after at least a portion of the scale inhibitor has been introduced into the portion of the subterranean formation.

19. The method of claim 18 further comprising allowing at least a portion of the scale inhibitor to adsorb onto a rock surface in at least a portion of the subterranean formation.

20. The method of claim 18 further comprising:
    shutting in the well bore for about 6 hours to about 24 hours; and
    allowing one or more produced fluids in the subterranean formation to flow from the formation and through the well bore after the predetermined period of time has ended.

* * * * *